(12) United States Patent
Orihara

(10) Patent No.: US 8,225,352 B2
(45) Date of Patent: Jul. 17, 2012

(54) VIEWING RECOMMENDATION APPARATUS AND METHOD

(75) Inventor: Ryohei Orihara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 876 days.

(21) Appl. No.: 11/385,758

(22) Filed: Mar. 22, 2006

(65) Prior Publication Data

US 2007/0055994 A1 Mar. 8, 2007

(30) Foreign Application Priority Data

Sep. 8, 2005 (JP) ................................. 2005-261029

(51) Int. Cl.
*G06F 3/00* (2006.01)

(52) U.S. Cl. ......................................................... 725/46

(58) Field of Classification Search .............. 725/37–61, 725/91–97
See application file for complete search history.

(56) References Cited

U.S. PATENT DOCUMENTS

| 6,408,437 | B1 * | 6/2002 | Hendricks et al. ............ 725/132 |
| 6,425,128 | B1 * | 7/2002 | Krapf et al. ..................... 725/37 |
| 6,782,550 | B1 * | 8/2004 | Cao ................................. 725/39 |
| 6,973,665 | B2 * | 12/2005 | Dudkiewicz et al. ........... 725/46 |
| 2002/0042923 | A1 * | 4/2002 | Asmussen et al. .............. 725/92 |
| 2002/0144264 | A1 * | 10/2002 | Broadus ........................... 725/39 |
| 2002/0157096 | A1 * | 10/2002 | Hane et al. ...................... 725/46 |
| 2003/0221196 | A1 * | 11/2003 | Connelly ....................... 725/110 |
| 2004/0040037 | A1 * | 2/2004 | Kim ................................ 725/40 |
| 2004/0221308 | A1 * | 11/2004 | Cuttner et al. .................. 725/46 |
| 2005/0165782 | A1 * | 7/2005 | Yamamoto .......................... 707/7 |
| 2005/0172318 | A1 * | 8/2005 | Dudkiewicz et al. ........... 725/46 |
| 2005/0251863 | A1 * | 11/2005 | Sima ................................. 726/25 |
| 2006/0041906 | A1 * | 2/2006 | Vermola .......................... 725/39 |
| 2007/0033616 | A1 * | 2/2007 | Gutta .............................. 725/58 |
| 2007/0044122 | A1 * | 2/2007 | Scholl et al. .................... 725/46 |
| 2007/0271582 | A1 * | 11/2007 | Ellis et al. ....................... 725/46 |

FOREIGN PATENT DOCUMENTS

| JP | 11-196389 | 7/1999 |
| JP | 2001-101797 | 4/2001 |
| JP | 2002-354386 | 12/2002 |
| JP | 2004-96530 | 3/2004 |

OTHER PUBLICATIONS

Notification of Reasons for Rejection mailed Nov. 4, 2008 by Japanese Patent Office in Counterpart Application No. 2005-261029 (5 pages).

* cited by examiner

*Primary Examiner* — Dominic D Saltarelli
*Assistant Examiner* — Alfonso Castro
(74) *Attorney, Agent, or Firm* — Finnegan, Henderson, Farabow, Garrett & Dunner, L.L.P.

(57) ABSTRACT

A viewing recommendation apparatus includes an acquisition unit configured to acquire first broadcast program information for each of first broadcast programs to be broadcasted, a storage unit configured to store a plurality of previously broadcasted second broadcast programs in correspondence with second broadcast program information, a calculation unit configured to calculate an urgency in accordance with the first broadcast program information and the second broadcast program information to obtain a plurality of urgencies, the urgency indicating a degree to view a broadcast program earlier, and a generation unit configured to generate a recommendation list of programs to be viewed based on levels of the urgencies.

12 Claims, 2 Drawing Sheets

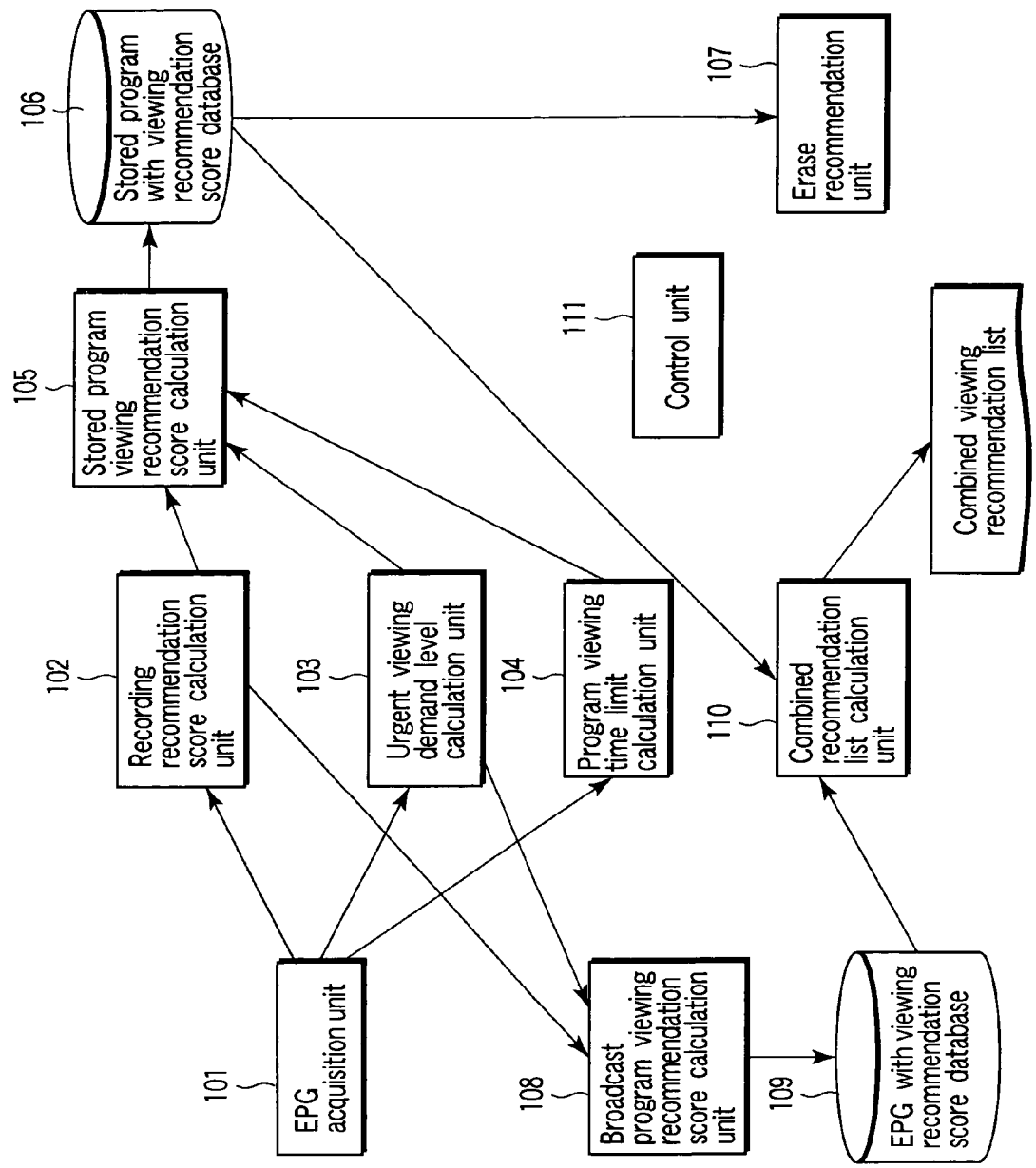
F I G. 1

VIEWING RECOMMENDATION APPARATUS AND METHOD

CROSS-REFERENCE TO RELATED APPLICATIONS

This application is based upon and claims the benefit of priority from prior Japanese Patent Application No. 2005-261029, filed Sep. 8, 2005, the entire contents of which are incorporated herein by reference.

BACKGROUND OF THE INVENTION

1. Field of the Invention

The present invention relates to a viewing recommendation apparatus and method, which make recommendation of programs the user might want to view based on broadcast programs and stored content (stored programs) in a TV reception, storage, and playback system which allows the user to view multi-channel broadcast programs, and comprises a storage device such as a hard disk drive (HDD) or the like which can store previous broadcast programs.

2. Description of the Related Art

In recent years, direct broadcasting by satellite has prevailed in addition to terrestrial TV broadcasting, and TV broadcasting has entered a full-scale multi-channel era. Conventionally, programs to view are searched by browsing the TV schedule in the newspaper or program guides. However, with this method, programs that the user wants to view may often be missed. Using an electronic program guide (EPG) provided by the broadcast signal or a web site (iEPG) that allows the user to browse the EPG on the Internet, programs are searched using a genre- or keyword-based search function provided by the EPG or iEPG. On some iEPG sites, a push function that notifies programs which match genres and keywords registered in advance via e-mail is implemented.

Simultaneously with the multi-channel era, recorders which comprise a large-capacity storage such as an HDD have prevailed in place of the conventional VTR. There are two roles of the recorder at home: (1) an archiver used to view already viewed programs later again and (2) temporary storage of programs which cannot be viewed due to absence, program clash, other business to attend to, and the like at the time of broadcasting. Since a new recorder with a large-capacity storage is convenient, i.e., it does not require tape exchange, and has much higher recording quality than the VTR, it produces a large change in the role of (2). That is, in the era of VTR, a negative use "to be obliged to store programs that cannot be viewed at the time of broadcast" has prevailed, but a positive use style "to store programs to view them at a convenient time more than the time of broadcasting" is being established.

Using these techniques, an automatic recording function can be obviously implemented, and products have already been released. More specifically, genres and keywords are registered in advance, and programs which match them are automatically recorded. In some products, by analyzing the history of manual program recording of the user without registering any explicit genres or keywords, the genres and keywords that the user has an interest in are estimated, and automatic recording is done based on them.

Also, an apparatus which determines the priority in consideration of congeniality to a user's taste, the value of information depending on time, and economical efficiency of storage, and automatically stores information that matches the user's taste is available (for example, see Jpn. Pat. Appln. KOKAI No. 11-196389).

However, the conventional program recommendation function is basically a recording assistant function, and helps to select programs to be kept in a storage device from a large amount of broadcast programs, but it is not helpful about the viewing order of stored content. The assistant functions include, e.g., genre-dependent sort, recording date and time order sort, recording recommendation score order sort, and the like. However, these functions are merely obvious list display methods of stored content.

Also, no method of equally evaluating broadcast programs and stored content, and selecting a program or content that the user might want to view now is provided. Put simply, the user cannot select a program or content to view "now" from broadcast TV programs which are streamed in large quantities from multi-channels, and contents stored in large quantities in a large-capacity HDD.

BRIEF SUMMARY OF THE INVENTION

In accordance with a first aspect of the invention, there is provided a viewing recommendation apparatus comprising: an acquisition unit configured to acquire first broadcast program information for each of first broadcast programs to be broadcasted; a storage unit configured to store a plurality of previously broadcasted second broadcast programs in correspondence with second broadcast program information; a calculation unit configured to calculate an urgency in accordance with the first broadcast program information and the second broadcast program information to obtain a plurality of urgencies, the urgency indicating a degree to view a broadcast program earlier; and a generation unit configured to generate a recommendation list of broadcast programs to be viewed based on levels of the urgencies.

In accordance with a second aspect of the invention, there is provided a viewing recommendation method comprising: acquiring first broadcast program information for each of first broadcast programs to be broadcasted; preparing a storage unit configured to store a plurality of previously broadcasted second broadcast programs in correspondence with second broadcast program information; calculating an urgency in accordance with the first broadcast program information and the second broadcast program information to obtain a plurality of urgencies, the urgency indicating a degree to view a broadcast program earlier; and generating a recommendation list of broadcast programs to be viewed based on levels of the urgencies.

BRIEF DESCRIPTION OF THE SEVERAL VIEWS OF THE DRAWING

FIG. 1 is a block diagram of a viewing recommendation apparatus according to an embodiment of the present invention;

DETAILED DESCRIPTION OF THE INVENTION

Figure 2:
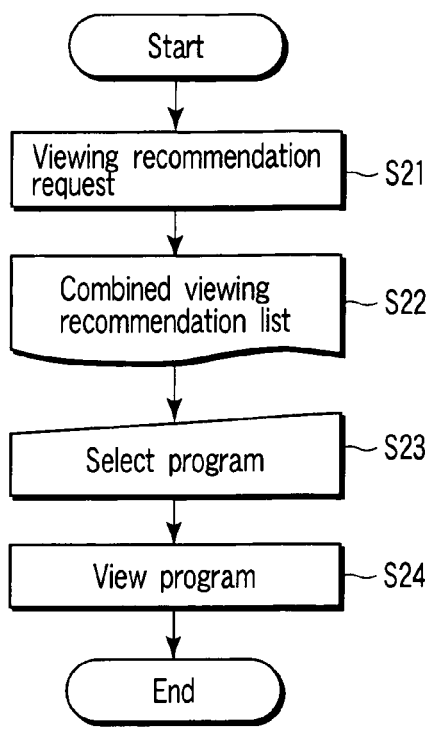
FIG. 2 is a flowchart showing an operation example when the user uses the viewing recommendation apparatus shown in FIG. 1.

A viewing recommendation apparatus and method according to an embodiment of the present invention will be described in detail hereinafter with reference to the accompanying drawings.

Important points of the viewing recommendation apparatus and method according to the embodiment of the present invention will be briefly explained first. The viewing recommendation apparatus of this embodiment appends one or more viewing recommendation indices, which are determined depending on elapsed time periods from original broadcasting times unlike recording recommendation indices, to broadcast programs and stored content ("stored content" corresponds to "stored programs" in FIG. 1) based on genres and the like of them. A viewing recommendation index indicates a viewing urgency determined for each program genre, and is obtained by rating knowledge such that it should be large for news and sports, relatively large for a drama series, middle for others, and so forth. Also, another viewing recommendation index is a viewing time limit of each of broadcast programs and stored content determined for each program genre (in case of stored content, a period until the significance of viewing of each stored content is substantially lost or time limit), and 24 hours or the like for a regular news program.

The viewing recommendation apparatus of this embodiment recommends a broadcast program or stored content to view at a specific time (viewing recommendation request time) by mainly using an arbitrary combination of the viewing recommendation indices or a combination of the recording recommendation index and viewing recommendation index. The viewing recommendation apparatus presents a viewing recommendation list including both broadcast programs and stored content by mainly using the viewing urgency which has a broadcast time as the viewing recommendation request time or a combination of it and the recording recommendation index for broadcast programs, and using the viewing time limit for stored content. Also, the apparatus recommends the storage device to erase stored content based on the viewing time limits, thus achieving effective use of the storage.

The arrangement of the viewing recommendation apparatus of this embodiment will be described below with reference to FIG. 1. FIG. 1 is a block diagram of the viewing recommendation apparatus according to the embodiment of the present invention.

The viewing recommendation apparatus of this embodiment comprises an EPG acquisition unit 101, recording recommendation score calculation unit 102, urgent viewing demand level calculation unit 103, program viewing time limit calculation unit 104, stored program viewing recommendation score calculation unit 105, stored program with viewing recommendation score database (DB) 106, erase recommendation unit 107, broadcast program viewing recommendation score calculation unit 108, EPG with viewing recommendation score database 109, combined recommendation list calculation unit 110, and control unit 111. Although not clearly specified in FIG. 1, the viewing recommendation apparatus of this embodiment has some recording recommendation indices, already stores previous storage content in a large-capacity storage based on the indices automatically or manually, and allows the user to view broadcast programs in large quantities.

The EPG acquisition unit 101 acquires EPG data by utilizing terrestrial digital broadcasting, direct broadcasting by satellite, cable broadcasting, Internet, and the like. The EPG acquisition unit 101 acquires EPG data periodically (e.g., once per day). In this case, the unit 101 acquires EPG data for 24 hours. Each EPG describes the program start times, program end times, program titles, program content, and the like.

The recording recommendation score calculation unit 102 calculates a recording recommendation score (R) for each broadcast program included in the acquired EPG data. The recording recommendation score (R) is defined depending on whether or not keywords are included in text that describes each broadcast program content. For example, when a specific keyword is described in the broadcast program content, this broadcast program has R=1; otherwise, it has R=0. The user may register keywords in advance in a database (not shown). The recording recommendation score calculation unit 102 (or control unit 111) may store a user's viewing history in a database, and may adopt words with a highest frequency of occurrence as keywords with reference to the viewing history.

The recording recommendation score calculation unit 102 may assign a recording recommendation score (R) with reference to the genre of each broadcast program included in the EPG data. In this case, the recording recommendation score (R) is defined depending whether or not the genre of each broadcast program matches a given genre. For example, when the genre of a broadcast program matches a specific genre, this broadcast program has R=0.9; otherwise, it has R=0.1.

Furthermore, the recording recommendation score calculation unit 102 may obtain a recording recommendation score (R) by computing the product of a score value calculated based on keywords and that calculated based on a genre. In the above example, if a keyword is described in the broadcast program content, and the genre of a broadcast program matches a given genre, this broadcast program has R=1× 0.9=0.9; if a keyword is described in the broadcast program content, but the genre of a broadcast program does not match a given genre, it has R=1×0.1=0.1.

Note that upon checking keyword descriptions and matching of genres, the recording recommendation score calculation unit 102 may search, e.g., a database of a synonymous dictionary (not shown) for words which are considered as synonyms of prepared keywords and genre names, and may calculate a recording recommendation score (R) based on the keywords and genre names including the words which are considered as synonyms.

The urgent viewing demand level calculation unit 103 calculates a viewing urgency (Im) for each broadcast program included in the acquired EPG data. The viewing urgency (Im) is a numerical value indicating a degree to view earlier, irrespective of an elapsed time period from the broadcast time of that broadcast program, and assumes, e.g., $0 < Im \leq 1$. The urgent viewing demand level calculation unit 103 calculates a viewing urgency (Im) according to a genre name assigned in correspondence with each program included in the EPG data.

For example, a table that specifies in advance values like 1 for a broadcast program to view immediately, 0.8 for a broadcast program which need not be viewed immediately compared to the former program but should be viewed relatively earlier, and 0.7 for a broadcast program which is considered to have an invaluable program content value irrespective of an elapsed time period from the broadcast time is generated. Note that broadcast programs to view immediately include news programs, and sports live programs, and broadcast programs to view relatively earlier include a drama series. Also, broadcast programs which are considered to have a invaluable program content value irrespective of an elapsed time period include movie programs and culture programs.

The urgent viewing demand level calculation unit 103 calculates a viewing urgency (Im) of each broadcast program with reference to the genre of each broadcast program included in the acquired EPG data and such table that specifies values in advance.

Note that upon checking matching of genres, the urgent viewing demand level calculation unit 103 may search, e.g., a database of a synonymous dictionary (not shown) for words which are considered as synonyms of genre names, and may calculate a viewing urgency (Im) based on the genre names including the words which are considered as synonyms.

The program viewing time limit calculation unit 104 calculates a viewing time limit index (E) for each broadcast program included in the acquired EPG data. The viewing time limit index (E) is determined depending on an elapsed time period from the broadcast time, and is a numerical value that meets $0<E \leqq 1$. As the value is larger, the viewing time limit index (E) indicates a higher viewing worth of a broadcast program. The program viewing time limit calculation unit 104 calculates a viewing time limit index (E) at the time of acquisition of EPG data. For all broadcast programs included in the acquired EPG data, the unit 104 sets 1 as an initial value of the viewing time limit index (E). That is, broadcast programs which have not been broadcasted yet have a viewing time limit index (E)=1.

The program viewing time limit calculation unit 104 re-calculates E for stored content which have already been stored and those whose recording is underway. Upon making this re-calculation, the program viewing time limit calculation unit 104 calculates a viewing time limit index (E) according to a formula already determined for each genre with reference to genre information included in the EPG data. Let d* be the broadcasting day, and d be today. Then, when EPG data is acquired at a fixed time once per day, formulas can be determined for respective genres as:

News: $E=1/(d-d^*+1)^2$

Sports: $E=\max((d^*-d)/5+1, 0.01)$

Movie: E=1

Others: $E=\max((d^*-d)/30+1, 0.1)$

As in this example, the viewing time limit index (E) of a stored content that places an importance on the degree of freshness rapidly becomes smaller along with elapsed time. Also, the viewing time limit index (E) of a stored content which is considered to have the degree of freshness that remains unchanged becomes invaluable with respect to time.

The formulas determined for respective genres must be changed depending on the acquisition time interval of EPG data by the EPG acquisition unit 101. For example, when the EPG acquisition unit 101 acquires EPG data twice or more per day, the formula determined for each genre must include time as a variable.

The stored program viewing recommendation score calculation unit 105 receives the recording recommendation score (R), viewing urgency (Im), and viewing time limit index (E), which are respectively calculated by the recording recommendation score calculation unit 102, urgent viewing demand level calculation unit 103, and program viewing time limit calculation unit 104, for each stored content, and calculates a viewing recommendation score (V) for each stored content by combining these effects. A stored content has a higher degree to view urgently by the user with increasing viewing recommendation score (V). The viewing recommendation score (V) is given by, e.g.:

$V=R \times Im \times E$

According to the aim of the recommendation to be made, the recording recommendation score (R), viewing urgency (Im), and viewing time limit index (E) may be respectively weighted or may undergo nonlinear conversion. For example, the score (V) is given by, e.g., $V=R^2 \times 10 \times Im \times E^{1/2}$.

The stored program with viewing recommendation score database 106 stores each viewing recommendation score (V) calculated by the stored program viewing recommendation score calculation unit 105 in correspondence with a stored content as an object of this score.

The erase recommendation unit 107 prompts the user to erase unnecessary ones of the stored content and viewing recommendation scores (V) stored in the stored program with viewing recommendation score database 106 from the stored program with viewing recommendation score database 106. Whether or not a stored content is unnecessary is determined based on its viewing time limit index (E). A value Eth (which satisfies 0<Eth<1 in the above example) is set in advance, and the erase recommendation unit 107 compares this Eth with the viewing time limit index (E) stored in correspondence with each stored content. If the viewing time limit index (E) is smaller than Eth, the unit 107 prompts the user to erase the stored content having this index. The erase recommendation unit 107 may automatically erase this unnecessary stored content and corresponding viewing recommendation score (V) without prompting the user to erase.

The broadcast program viewing recommendation score calculation unit 108 receives the recording recommendation score (R) and viewing urgency (Im), which are respectively calculated by the recording recommendation score calculation unit 102 and urgent viewing demand level calculation unit 103, for each broadcast program, and calculates a viewing recommendation score (V) for each broadcast program by combining these effects. The viewing recommendation score (V) corresponds to the viewing recommendation score (V) in case of E=1 calculated by the stored program viewing recommendation score calculation unit 105. Since broadcast programs to be handled by the broadcast program viewing recommendation score calculation unit 108 are all future programs, a viewing time limit index (E) is set to "1".

The EPG with viewing recommendation score database 109 stores each viewing recommendation score (V) calculated by the broadcast program viewing recommendation score calculation unit 108 in correspondence with a broadcast program as an object of this score. Information stored in the EPG with viewing recommendation score database 109 is updated every time the EPG acquisition unit 101 acquires EPG data.

The combined recommendation list calculation unit 110 accepts a user's instruction that requests presentation of recommended broadcast programs or recommended stored content, and acquires broadcast programs together with their viewing recommendation scores (V) in descending order of viewing recommendation score (V) from those which will be broadcasted from the present time until a near future (e.g., during today) with reference to the EPG with viewing recommendation score database 109 at the time of acceptance of this instruction. Furthermore, the combined recommendation list calculation unit 110 acquires stored content together with their viewing recommendation scores (V) from the stored program with viewing recommendation score database 106 in descending order of viewing recommendation score (V). The combined recommendation list calculation unit 110 generates a list (combined viewing recommendation score list; also called "broadcast program and stored program mixed recommendation list") in descending order of viewing recommendation score (V) of the broadcast programs and stored content which are acquired from the stored program with viewing recommendation score database 106 and EPG with viewing recommendation score database 109, and presents the generated list to the user. As a matter of course, the numbers of broadcast programs and stored content to be presented to the user and the like are design items, and can be changed as needed.

The control unit 111 controls respective units of the viewing recommendation apparatus. For example, the control unit 111 automatically records broadcast programs with high recording recommendation scores (R) from those included in the acquired EPG data. The control unit 111 may set a threshold Rth of the recording recommendation score (R) as an index indicating whether or not to record. When the value of the recording recommendation score (R) calculated for a given broadcast program by the recording recommendation score calculation unit 102 exceeds Rth, the control unit 111 may automatically record this broadcast program.

The operation executed when the user uses the viewing recommendation apparatus of this embodiment will be described below with reference to FIG. 2.

The combined recommendation list calculation unit 110 accepts a viewing recommendation request from the user (step S21). The viewing recommendation request is used to request a list which informs the user of broadcast programs or stored content which are assumed to be currently viewed best by the user and is to be presented to the user. The viewing recommendation request may be generated by an explicit user's operation (e.g., depression of a given button of a remote controller) or may be automatically generated in response to, e.g., an end event of the previous recommended broadcast program or previous recommended stored content.

Upon acceptance of the viewing recommendation request in step S21, the combined recommendation list calculation unit 110 recommends programs to view by the user from stored content, on-air programs, and programs which will begin to be broadcasted in the near future (e.g., within 30 minutes), and typically presents them to the user in the form of a list (step S22).

The user selects a broadcast program or stored content from the list (step S23), and the viewing recommendation apparatus executes appropriate processing depending on whether the selected broadcast program or stored content is a stored content, on-air program, or pre-broadcast program (step S24). The apparatus executes playback, time-shift playback, or viewing reservation processing depending on whether the selected broadcast program or stored content is a stored content, on-air program, or pre-broadcast program. Note that details of such processing may change depending on whether or not the viewing recommendation apparatus has an automatic recording function. In steps S23 and S24, the control unit 111 controls the processing.

Figure 3:
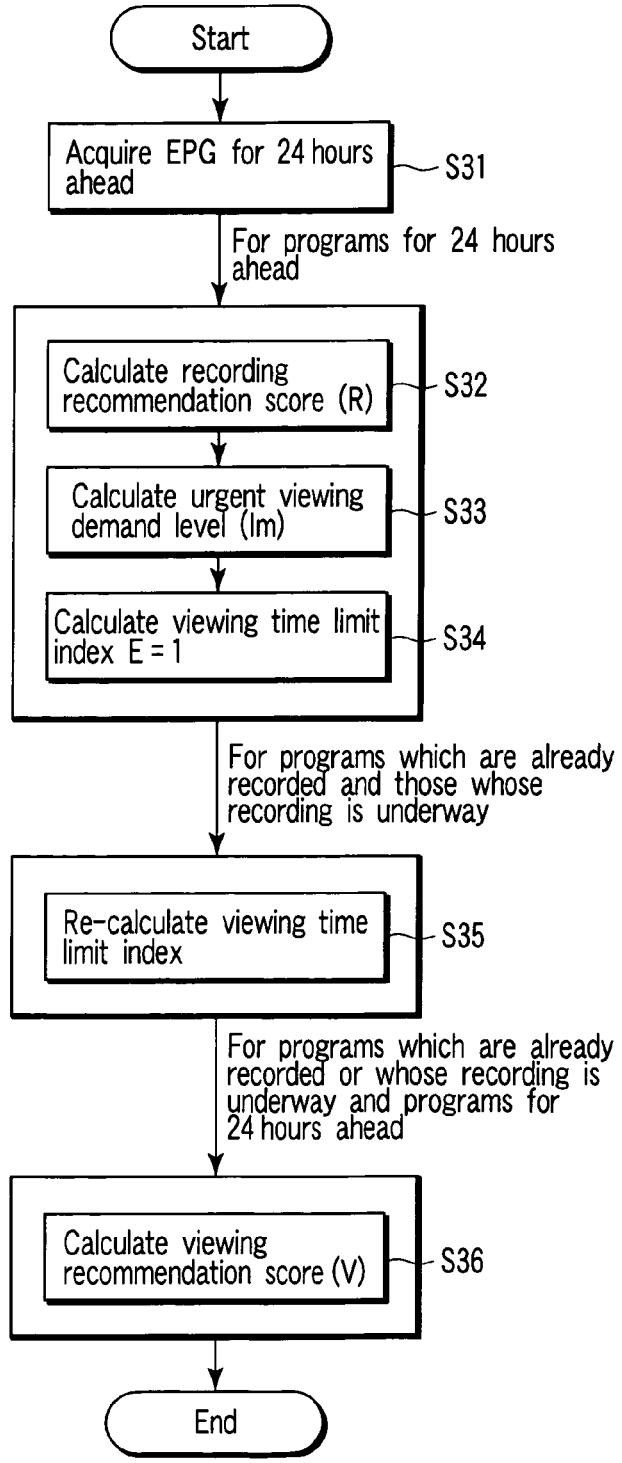
FIG. 3 is a flowchart showing processing when the viewing recommendation apparatus shown in FIG. 1 generates a combined viewing recommendation list.

The flow of processing executed when the viewing recommendation apparatus of this embodiment generates a combined recommendation list will be described below with reference to FIG. 3.

Assume that a database (not shown) which can hold various attribute values for respective broadcast programs or stored content, which are calculated by the viewing recommendation apparatus, in addition to EPG information is provided. Also, assume that meta information of each of manually or automatically recorded stored content are kept held until the corresponding stored content is erased from the stored program with viewing recommendation score database 106. Furthermore, assume that a series of processes described in FIG. 3 are periodically executed once per day.

The EPG acquisition unit 101 acquires EPG data for 24 hours ahead (step S31). The recording recommendation score calculation unit 102 calculates recording recommendation scores (R) for respective acquired broadcast programs (step S32). If the viewing recommendation apparatus has an automatic recording function, the control unit 111 executes processing for automatic recording in this step.

The urgent viewing demand level calculation unit 103 calculates viewing urgencies (Im) for respective acquired broadcast programs (step S33). Next, the program viewing time limit calculation unit 104 calculates viewing time limit indices (E) for respective acquired broadcast programs. Initially, the program viewing time limit calculation unit 104 sets 1 as an initial value of a viewing time limit index (E) for all the broadcast programs included in the acquired EPG data (step S34). The program viewing time limit calculation unit 104 re-calculates E using the above formulas for stored content which are already stored and those whose recording is underway (step S35).

With the above processes, since the recording recommendation scores (R), viewing urgencies (Im), and viewing time limit indices (E) can be calculated for all broadcast programs and all stored content (i.e., programs whose recording is underway and which are already recorded for 24 hours ahead), the combined recommendation list calculation unit 110 calculates viewing recommendation scores (V) based on combinations of them (step S36).

Since the viewing recommendation apparatus of this embodiment must calculate recommendation scores which change depending on a time, a method of periodically re-calculating scores (some of them), and a method of calculating scores on-demand in response to a recommendation request may be used. In the aforementioned example, a periodic calculation per day has been exemplified as a most feasible method based on the performance of currently available hardware and the viewing life styles of general users. However, if advanced hardware is available, a method of calculating scores on-demand may be adopted.

According to the aforementioned embodiment, contents the user might want to view can be recommended from broadcast programs and stored content in consideration of features of respective content. According to this embodiment, in consideration that the degree to view each content may change depending on the time, recommended broadcast programs or recommended stored content at the time of the recommendation request can be presented based on the request time of them by the user. Since contents can be appropriately erased, the usability of the system can be prevented from dropping due to a large quantity of viewing worthless content stored in the large-capacity storage.

Therefore, according to this embodiment, not only recording is assisted, but also content to view are presented in response to a user's viewing request, thus improving the user's true viewing satisfaction level.

According to the viewing recommendation apparatus and method of the embodiment of the present invention, contents the user might want to view can be recommended from broadcast content and stored content.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A viewing recommendation apparatus comprising:
an acquisition unit configured to acquire first broadcast program information for each of first broadcast programs to be broadcasted;
a storage unit configured to store a plurality of previously broadcasted second broadcast programs in correspondence with second broadcast program information;
a calculation unit configured to calculate a viewing urgency in accordance with the first broadcast program information and the second broadcast program information to obtain a plurality of viewing urgencies, the viewing urgency indicating a degree of immediacy of viewing a broadcast program due to time-sensitivity of content in the broadcast program;

a score calculation unit configured to calculate, for each of the first broadcast programs, a recording recommendation score based on keywords, synonyms of the keywords, and genres, which are associated with each of the first broadcast programs, the recording recommendation score indicating a degree to record a broadcast program, thereby obtaining a plurality of recording recommendation scores for each of the first broadcast programs; and a generation unit configured to generate a recommendation list of broadcast programs to be viewed, selected from among the first broadcast programs and the second broadcast programs, based on levels of the viewing urgencies, and to generate, from the first broadcast programs and the second broadcast programs, based on the viewing urgencies and the recording recommendation scores, the recommendation list of broadcast programs that are sorted in order of the broadcast programs to view.

2. The apparatus according to claim 1, wherein the calculation unit calculates the viewing urgency in accordance with a genre name of a broadcast program included in the first broadcast programs and the second broadcast programs, and the generation unit generates, based on the first broadcast programs and the second broadcast programs, the recommendation list of broadcast programs which are sorted in order of the viewing urgencies.

3. The apparatus according to claim 1, wherein the score calculation unit calculates the recording recommendation score based on at least one of a keyword which is designated in advance and is described in the first broadcast program information and a genre name of a broadcast program included in the first broadcast programs and the second broadcast programs.

4. The apparatus according to claim 1, further comprising an index calculation unit configured to calculate an index for each of the first broadcast programs and the second broadcast programs for obtaining a plurality of indices, the index indicating a viewing worth depending on an elapsed time period from a broadcasting time based on the first broadcast program information and the second broadcast program information, wherein the generation unit generates, based on the levels of the viewing urgencies, the recording recommendation scores, and the indices, the recommendation list of broadcast programs which are sorted in order of the broadcast programs to be viewed.

5. The apparatus according to claim 4, wherein the index calculation unit sets the index to a constant for each of the first broadcast programs, and calculates, for each of the second broadcast programs, the index based on a genre name of each of the second broadcast programs.

6. The apparatus according to claim 4, further comprising an erase unit configured to erase a broadcast program of the second broadcast programs from the storage unit when the index of the broadcast program of the second broadcast programs is smaller than a preset value.

7. A viewing recommendation method performed by a broadcast program recording apparatus, the method comprising:

acquiring, by the recording apparatus, first broadcast program information for each of first broadcast programs to be broadcasted;

preparing, by the recording apparatus, a storage unit configured to store a plurality of previously broadcasted second broadcast programs in correspondence with second broadcast program information;

calculating, by the recording apparatus, a viewing urgency in accordance with the first broadcast program information and the second broadcast program information to obtain a plurality of viewing urgencies, the viewing urgency indicating a degree of immediacy of viewing a broadcast program due to time-sensitivity of content in the broadcast program;

calculating, by the recording apparatus, for each of the first broadcast programs, a recording recommendation score based on keywords, synonyms of the keywords, and genres, which are associated with each of the first broadcast programs, the recording recommendation score indicating a degree to record a broadcast program, thereby obtaining a plurality of recording recommendation scores for each of the first broadcast programs;

generating, by the recording apparatus, a recommendation list of broadcast programs to be viewed, selected from among the first broadcast programs and the second broadcast programs, based on levels of the viewing urgencies; and generating, from the first broadcast programs and the second broadcast programs, based on the viewing urgencies and the recording recommendation scores, the recommendation list of broadcast programs that are sorted in order of the broadcast programs to view.

8. The method according to claim 7, wherein calculating the viewing urgency calculates the viewing urgency in accordance with a genre name of a broadcast program included in the first broadcast programs and the second broadcast programs, and the generating the recommendation list generates the recommendation list of broadcast programs which are sorted in order of the viewing urgencies.

9. The method according to claim 7, wherein the recording recommendation score is calculated based on at least one of a keyword which is designated in advance and is described in the first broadcast program information and a genre name of a broadcast program included in the first broadcast programs and the second broadcast programs.

10. The method according to claim 7, further comprising calculating, by the recording apparatus, an index, for each of the first broadcast programs and the second broadcast programs for obtaining a plurality of indices, the index indicating a viewing worth depending on an elapsed time period from a broadcasting time based on the first broadcast program information and the second broadcast program information, wherein generating, based on the levels of the viewing urgencies, the recording recommendation scores, and the indices, the recommendation list generating the recommendation list of broadcast programs which are sorted in order of the broadcast programs to be viewed.

11. The method according to claim 10, wherein calculating the index setting the index to a constant for each of the first broadcast programs, and calculating, for each of the second broadcast programs, the index based on a genre name of each of the second broadcast programs.

12. The method according to claim 10, further comprising erasing, by the recording apparatus, a broadcast program of the second broadcast programs from the storage unit when the index of the broadcast program of the second broadcast programs is smaller than a preset value.

* * * * *